US012560446B2

(12) United States Patent (10) Patent No.: US 12,560,446 B2
Narayanan et al. (45) Date of Patent: Feb. 24, 2026

(54) METHOD AND SYSTEM OF ELECTRIC VEHICLE ROUTE PLANNING FOR MULTI-SERVICE DELIVERY AND ON-ROUTE ENERGY REPLENISHMENT

(71) Applicant: Tata Consultancy Services Limited, Mumbai (IN)

(72) Inventors: Ajay Narayanan, Bangalore (IN); Prasant Kumar Misra, Bangalore (IN); Ankush Ojha, Nodia (IN); Arunchandar Vasan, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 195 days.

(21) Appl. No.: 18/368,818

(22) Filed: Sep. 15, 2023

(65) Prior Publication Data

US 2024/0183674 A1 Jun. 6, 2024

(51) Int. Cl.
| | |
|---|---|
| *G01C 21/34* | (2006.01) |
| *B60L 53/67* | (2019.01) |
| *B60L 55/00* | (2019.01) |
| *G06N 3/08* | (2023.01) |

(Continued)

(52) U.S. Cl.
CPC .......... *G01C 21/3469* (2013.01); *B60L 53/67* (2019.02); *B60L 55/00* (2019.02); *G06N 3/08* (2013.01); *G06N 3/092* (2023.01); *G06Q 10/047* (2013.01)

(58) Field of Classification Search
CPC ..... G01C 21/3469; G06N 3/092; B60L 53/67; B60L 53/68
See application file for complete search history.

(56) References Cited

U.S. PATENT DOCUMENTS

| | | | |
|---|---|---|---|
| 11,325,492 | B2 | 5/2022 | Viswanathan et al. |
| 2019/0377349 | A1* | 12/2019 | van der Merwe ... G05D 1/0212 |
| 2022/0041076 | A1* | 2/2022 | Sadeghianpourhamami ............... |
| | | | G06Q 50/40 |

OTHER PUBLICATIONS

Abdulaal et al., "Solving the Multivariant EV Routing Problem Incorporating V2G and G2V Options," Sep. 28, 2016 [online] <URL: https://ieeexplore.ieee.org/document/7579135> (Year: 2016).*

(Continued)

*Primary Examiner* — Scott A Browne
*Assistant Examiner* — Jason Nguyen
(74) *Attorney, Agent, or Firm* — Finnegan, Henderson, Farabow, Garrett & Dunner, LLP

(57) ABSTRACT

Method and system of electric vehicle route planning for multi-service delivery and on-route energy replenishment is disclosed. Last mile delivery is a critical component of supply chains that impacts both customer experience and delivery cost. User request is received by a depot of a delivery environment. The user request comprising a current location of the user, one or more required services, and a time window rendered between each of the required services is processed and a graph is generated for the user request. Further, trained learning agent generates a route map indicating a plurality of waypoint locations for the electric vehicle to visit each node in accordance with minimized trip cost of fleet and time duration where each node has a state action pair for the electric vehicle. The learning agent learns continuously during the interaction with delivery environment and obtains feedback for every associated action.

13 Claims, 5 Drawing Sheets

(51) Int. Cl.
　　*G06N 3/092* 　　　　(2023.01)
　　*G06Q 10/047* 　　　(2023.01)

(56) References Cited

OTHER PUBLICATIONS

Erdoğan et al., "A Green Vehicle Routing Problem," Jul. 12, 2011 [online] <URL: https://www.sciencedirect.com/science/article/pii/S1366554511001062> (Year: 2011).*

Sultana et al., "Fast Approximate Solutions using Reinforcement Learning for Dynamic Capacitated Vehicle Routing with Time Windows," Apr. 14, 2021 [online] <URL: https://arxiv.org/abs/2102.12088> (Year: 2021).*

Erdelic et al., "A Survey on the Electric Vehicle Routing Problem: Variants and Solution Approaches," May 9, 2019 [online] <URL: https://onlinelibrary.wiley.com/doi/10.1155/2019/5075671?msockid=35209cba3ce768eb2952894e3d7269a4> (Year: 2019).*

Alqahtani et al., "Dynamic Energy Scheduling and Routing of a Large Fleet of Electric Vehicles using Multi-Agent Reinforcement Learning," (2022).

Narayanan et al., "A Reinforcement Learning Approach for Electric Vehicle Routing Problem with Vehicle-to-Grid Supply," (2022).

Viziteu et al., "Smart Scheduling of Electric Vehicles Based on Reinforcement Learning," Sensors, 22, (2022).

* cited by examiner

300 receive by a base depot of a delivery environment a user request comprising a current location of the user, one or more required services, and a time window rendered between each of the required services, wherein the base depot comprises a trained learning agent and a set of preconfigured electric vehicles (EV)

302 generate a graph of the user request, wherein in the graph each node represents the base depot, a set of users, a set of discharging stations, and a set of battery swap stations, and an edge represents a relation between two or more connecting nodes

304 model by using a state generator a state of the learning agent to process the user request and assigning a reward value to the learning agent for every associated action

306 generate by the learning agent a route map indicating a plurality of waypoint locations for the electric vehicle to visit each node in accordance with minimized trip cost of fleet and time duration, wherein each node has a state action pair for a driver of the electric vehicle

METHOD AND SYSTEM OF ELECTRIC VEHICLE ROUTE PLANNING FOR MULTI-SERVICE DELIVERY AND ON-ROUTE ENERGY REPLENISHMENT

PRIORITY CLAIM

This U.S. patent application claims priority under 35 U.S.C. § 119 to: Indian Patent Application No. 202221066033, filed on Nov. 17, 2022. The entire contents of the aforementioned application are incorporated herein by reference.

TECHNICAL FIELD

The disclosure herein generally relates to vehicle routing, and, more particularly, to method and system of electric vehicle route planning for multi-service delivery and on-route energy replenishment.

BACKGROUND

Electric vehicles (EV) are certainly shaping the future of last-mile delivery. Utilization of electric vehicles in transportation sector provides several advantages in favor of climate protection and shared economy. Specifically, mobility sector is at the top of decarbonization agenda for many countries. Rapid growth of electric vehicles also demands innovative solutions to mitigate risks for unpredictable charging patterns of electric vehicles. For emerging future, where electric vehicles are poised to replace vehicles powered by internal combustion engines, package delivery companies and other vehicle fleet operators face additional challenges in route optimization including minimizing energy usage and exploiting charging opportunities.

In such scenarios, electric vehicles lack in providing multi-service deliveries such as increase in capital costs of electric vehicles, non-availability of captive chargers, of public charging and time to charge are potential challenges. Last mile delivery is a critical component of supply chains that impacts both user experience and fifty percent of delivery cost. Logistics and e-commerce businesses constantly aim to improve last-mile delivery using new technologies and processes. Use of electric vehicles (EV) in last mile potentially improves operational cost in addition to sustainability and emission goals. However, existing approaches lack in large scale problem instances that involve hundreds of users, battery swapping and discharging stations with multiple operational constraints with reasonable solution accuracy and computational time.

SUMMARY

Embodiments of the present disclosure present technological improvements as solutions to one or more of the above-mentioned technical problems recognized by the inventors in conventional systems. For example, in one embodiment, a system for electric vehicle route planning for multi-service delivery and on-route energy replenishment is provided. The system includes to receive a user request comprising a current location of the user, one or more required services, and a time window rendered between each of the required services. The depot comprises a trained learning agent and a set of preconfigured electric vehicles (EV). Further, a graph of the user request is generated wherein in the graph each node represents the depot, a set of users, a set of discharging stations, and a set of battery swap stations, and an edge represents a relation between two or more connecting nodes. The state generator models a state of the learning agent to process the user request and assigning a reward value to the learning agent for every associated action. Then, the learning agent learns a route map indicating a plurality of waypoint locations for the electric vehicle to visit each node in accordance with minimized trip cost of fleet and time duration. Each node has a state action pair for a driver of the electric vehicle. The learning agent learns continuously during the interaction with the delivery environment and obtains feedback for every associated action.

In accordance with an embodiment, the learning agent is trained to generate the route map by performing the steps of initialising a neural network with one or more weights $\phi$, a batch size $\beta$, and a replay buffer B. The method iteratively performs for every episode where the learning agent learns to map state and one or more feasible action pairs by randomly selecting data instance from a training dataset and reset the delivery environment to obtain initial states of all possible vehicle node pairs from the depot. Here, a copy of the delivery environment is created for local state updates when a decision time instant t is lesser than a decision horizon T. Further, one or more feasible combinations of vehicle node pairs are identified based on availability of electric vehicle from the set of electric vehicles. The learning agent calculates an action value $q_t$ for each feasible combination of vehicle node pair by sending the state $S_t$ of the learning agent as input to the neural network. A feasible vehicle node pair is selected based on maximum action value and performing local state updates on the copy of the delivery environment. The learning agent is assigned with a reward $R_t$ for every associated action performed in each feasible vehicle node pair. The replay buffer is updated with the state $S_t$, the reward $R_t$, and the action value $q_t$ and oldest entries are deleted from the replay buffer B size exceeds a predefined buffer capacity. Furthermore, randomly $\beta$ samples are removed from the replay buffer B at an end of every episode and the one or more weights $\phi$ of the neural network are updated by minimizing the mean squared error (MSE) between the action value $q_t$ and the reward $R_t$.

In another aspect, a method for electric vehicle route planning for multi-service delivery and on-route energy replenishment is provided. The method includes to receive a user request comprising a current location of the user, one or more required services, and a time window rendered between each of the required services. The depot comprises a trained learning agent and a set of preconfigured electric vehicles (EV). Further, a graph of the user request is generated wherein in the graph each node represents the depot, a set of users, a set of discharging stations, and a set of battery swap stations, and an edge represents a relation between two or more connecting nodes. The state generator models a state of the learning agent to process the user request and assigning a reward value to the learning agent for every associated action. Then, the learning agent learns a route map indicating a plurality of waypoint locations for the electric vehicle to visit each node in accordance with minimized trip cost of fleet and time duration. Each node has a state action pair for a driver of the electric vehicle. The learning agent learns continuously during the interaction with the delivery environment and obtains feedback for every associated action.

In accordance with an embodiment, the learning agent is trained to generate the route map by performing the steps of initialising a neural network with one or more weights $\phi$, a batch size $\beta$, and a replay buffer B. The method iteratively performs for every episode where the learning agent learns to map state and one or more feasible action pairs by randomly selecting data instance from a training dataset and reset the delivery environment to obtain initial states of all possible vehicle node pairs from the depot. Here, a copy of the delivery environment is created for local state updates when a decision time instant t is lesser than a decision horizon T. Further, one or more feasible combinations of vehicle node pairs are identified based on availability of electric vehicle from the set of electric vehicles. The learning agent calculates an action value $q_t$ for each feasible combination of vehicle node pair by sending the state $S_t$ of the learning agent as input to the neural network. A feasible vehicle node pair is selected based on maximum action value and performing local state updates on the copy of the delivery environment. The learning agent is assigned with a reward $R_t$ for every associated action performed in each feasible vehicle node pair. The replay buffer is updated with the state $S_t$, the reward $R_t$, and the action value $q_t$ and oldest entries are deleted from the replay buffer B size exceeds a predefined buffer capacity. Furthermore, randomly β samples are removed from the replay buffer B at an end of every episode and the one or more weights φ of the neural network are updated by minimizing the mean squared error (MSE) between the action value $q_t$ and the reward $R_t$.

In yet another aspect, a non-transitory computer readable medium for receiving a user request comprising a current location of the user, one or more required services, and a time window rendered between each of the required services. The depot comprises a trained learning agent and a set of preconfigured electric vehicles (EV). Further, a graph of the user request is generated wherein in the graph each node represents the depot, a set of users, a set of discharging stations, and a set of battery swap stations, and an edge represents a relation between two or more connecting nodes. The state generator models a state of the learning agent to process the user request and assigning a reward value to the learning agent for every associated action. Then, the learning agent learns a route map indicating a plurality of waypoint locations for the electric vehicle to visit each node in accordance with minimized trip cost of fleet and time duration. Each node has a state action pair for a driver of the electric vehicle. The learning agent learns continuously during the interaction with the delivery environment and obtains feedback for every associated action.

In accordance with an embodiment, the learning agent is trained to generate the route map by performing the steps of initialising a neural network with one or more weights φ, a batch size β, and a replay buffer B. The method iteratively performs for every episode where the learning agent learns to map state and one or more feasible action pairs by randomly selecting data instance from a training dataset and reset the delivery environment to obtain initial states of all possible vehicle node pairs from the depot. Here, a copy of the delivery environment is created for local state updates when a decision time instant t is lesser than a decision horizon T. Further, one or more feasible combinations of vehicle node pairs are identified based on availability of electric vehicle from the set of electric vehicles. The learning agent calculates an action value $q_t$ for each feasible combination of vehicle node pair by sending the state $S_t$ of the learning agent as input to the neural network. A feasible vehicle node pair is selected based on maximum action value and performing local state updates on the copy of the delivery environment. The learning agent is assigned with a reward $R_t$ for every associated action performed in each feasible vehicle node pair. The replay buffer is updated with the state $S_t$, the reward $R_t$, and the action value $q_t$ and oldest entries are deleted from the replay buffer B size exceeds a predefined buffer capacity. Furthermore, randomly β samples are removed from the replay buffer B at an end of every episode and the one or more weights φ of the neural network are updated by minimizing the mean squared error (MSE) between the action value $q_t$ and the reward $R_t$.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 is a flow diagram illustrating a method for presenting a route map information to a driver of an electric vehicle for multi-service delivery, according to some embodiments of the present disclosure.

DETAILED DESCRIPTION

Figure 1:
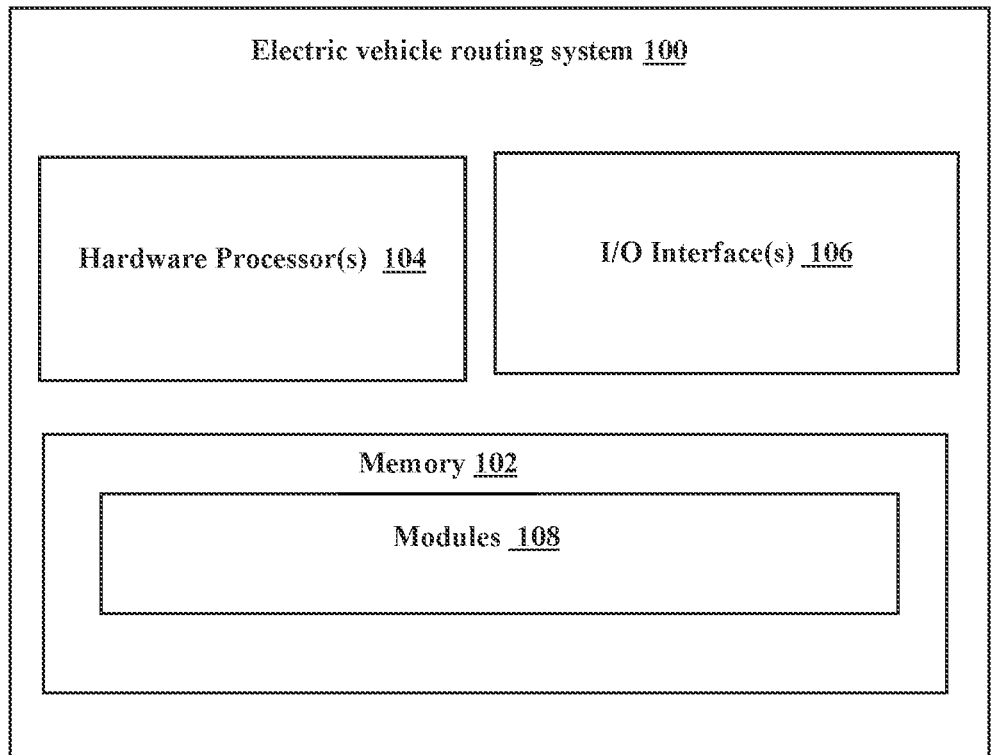
FIG. 1 illustrates an exemplary system for electric vehicle route planning for multi-service delivery and on-route energy replenishment, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system of electric vehicle route planning for multi-service delivery and on-route energy replenishment. The system may be alternatively referred as electric vehicle routing system 100. Electric vehicles (EV) are well suited for last mile delivery fleets due to better operational costs and lower emissions. EV fleets generate additional revenue by reducing total cost of ownership and readily available energy replenishment. Agent based learning approach is used for electric vehicle routing to perform multi-service delivery and on-route energy replenishment. EV batteries store electrical energy more efficiently than other technologies (example pumped storage). EV batteries can be discharged from vehicle to electricity grid (V2G) for augmenting the supply of the electrical grid during peak demand. This is especially helpful as a distributed energy resource (DER) when the supply-side of the grid is renewable heavy and highly variable. The vehicle to grid generates revenue if cost of charging is less than the cost of discharging. Depleted EV batteries can be rapidly swapped for fully charged batteries in many EV designs. As opposed to charging, battery swapping (SWP) can be done in less than 10 mins. The battery swapping center can also charge the depleted batteries during low demand periods of the grid at a lower time-of-day cost and thus leveraging an arbitrage opportunity. Finally, the use of battery swapping also reduces the demand for captive charging at fleet depots that can have significant capex cost. Appropriate usage of batteries in EV fleets has the potential to augment revenue through V2G and provides rapid energy replenishment. The disclosed system is further explained with the method as described in conjunction with FIG. 1 to FIG. 5 below.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates an exemplary system for electric vehicle route planning for multi-service delivery and on-route energy replenishment, according to some embodiments of the present disclosure. In an embodiment, the batch processing system 100 includes processor (s) 104, communication interface (s), alternatively referred as or input/output (I/O) interface(s) 106, and one or more data storage devices or memory 102 operatively coupled to the processor (s) 104. The system 100, with the processor(s) is configured to execute functions of one or more functional blocks of the system 100.

Referring to the components of the system 100, in an embodiment, the processor (s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The memory 102 may comprise information pertaining to input(s)/output(s) of each step performed by the processor(s) 104 of the system 100 and methods of the present disclosure. Functions of the components of system 100, for predicting batch processes, are explained in conjunction with FIG. 2 and FIG. 3 providing flow diagram, architectural overviews, and performance analysis of the system 100.

Figure 2:
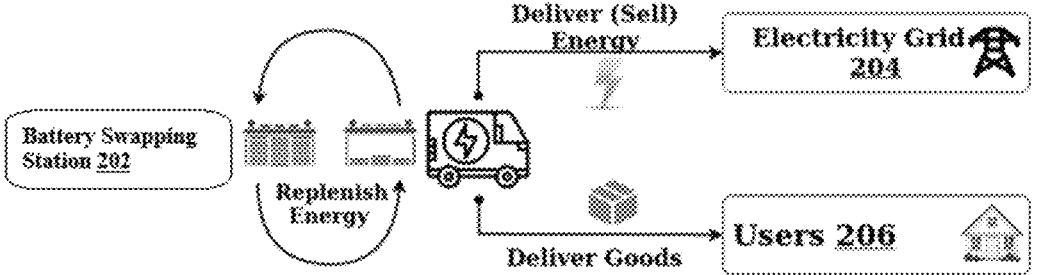
FIG. 2 is a block diagram illustrating components of electric vehicle route planning for multi-service delivery, according to some embodiments of the present disclosure.

FIG. 2 is a block diagram illustrating components of electric vehicle route planning for multi-service delivery, according to some embodiments of the present disclosure. Electric vehicle routing system 100 comprises a depot of the delivery environment, one or more multi-services for example a battery swapping stations 202 for energy replenishment, an electricity grid 204, and a set of users 206. Data communication between the various components of electric vehicle routing system 100 is facilitated via one or more data links connecting the components to each other. Electric vehicle routing system is installed in the delivery environment having the depot. The depot has a set of preconfigured electric vehicles to perform (or service) a user request. The user request may include a current location of the user, one or more required services, and a time window rendered between each of the required services. Electric motor of the electric vehicle is powered by electric vehicle battery. Electric vehicle battery status is monitored to determine the current charge of electric vehicle being available for providing a service. For the received user request the system 100 may analyse the potential routes to identify one or more desirable routes for travel. In evaluating the routes, the system 100 may use factors such as the weight (e.g., load, curb, gross) of the electric vehicle, the weight of a trailer (example load, curb, gross) pulled by the electric vehicle, atmospheric conditions, distance, grade, and elevation changes between starting location and destination, predicted rate of energy usage from the battery along a potential route, and the location of charging stations along the route.

Figure 3:
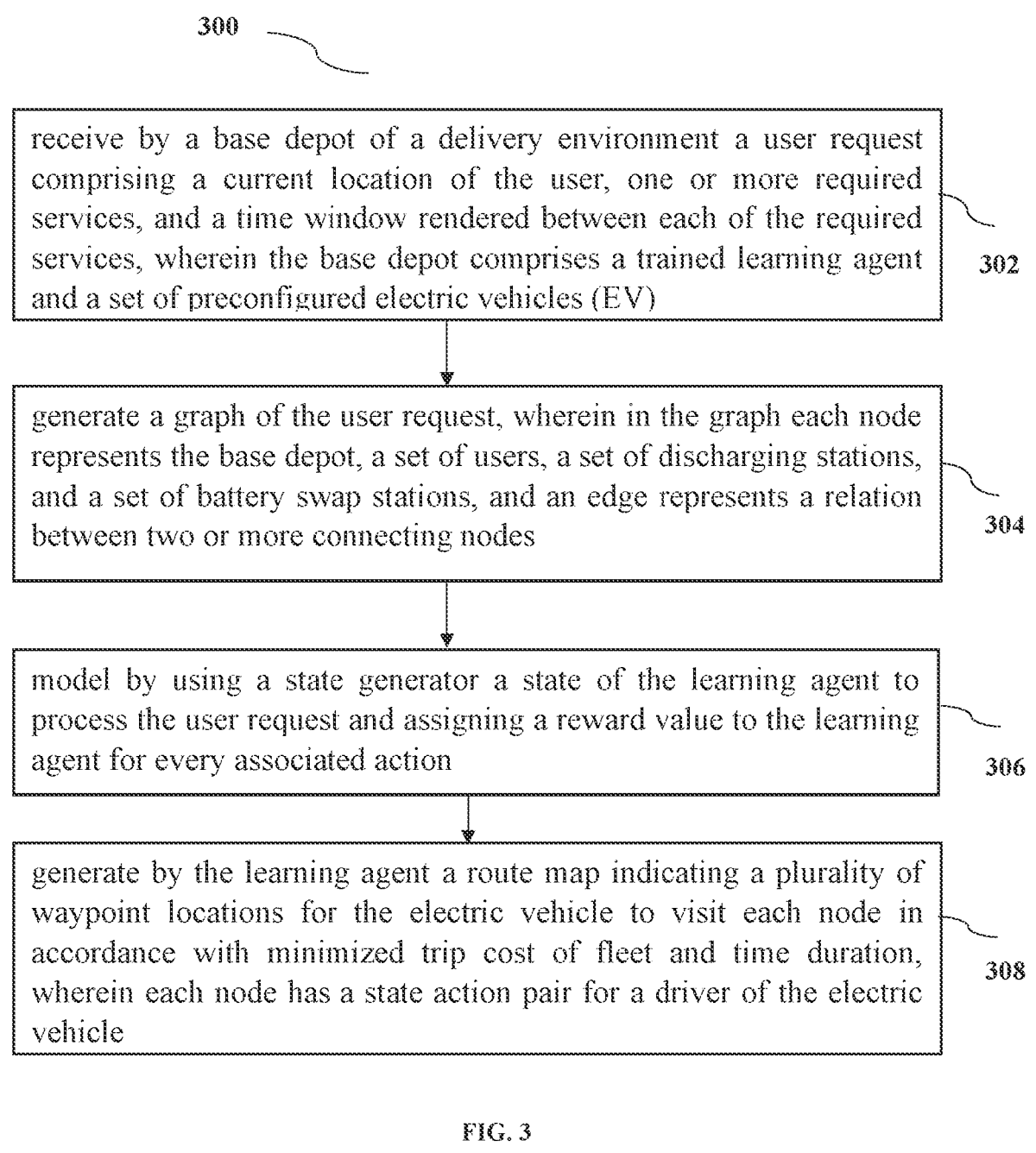

FIG. 3 is a flow diagram illustrating a method for presenting a route map information to a driver of an electric vehicle for multi-service delivery, according to some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 and FIG. 2, and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 receive by a depot of a delivery environment a user request comprising a current location of the user, one or more required services, and a time window rendered between each of the required services. The depot comprises a trained learning agent and a set of preconfigured electric vehicles. In an example, the user request may be performed (or serviced) with operating electric vehicle fleets which augments revenue by selling energy to the grid and rapidly replenish energy through battery swapping. The user request may include one or more required services to be performed by the EV fleet and which needs to be balanced between vehicle to grid and the battery swapping commences only after meeting the primary business objective of order deliveries. Such user request also considers one or more operational constraints for electric vehicle routing between the battery swapping stations and the vehicle to grid services. The one or more required services may be the delivery of goods to the user, the delivery of energy (to the grid through discharging stations), and the pickup of energy (from battery swapping stations) to find optimal cost-effective routes that guarantee order fulfillment and augment revenue through vehicle to grid.

In one embodiment, for the user request the fleet operator needs to plan the delivery routes for the fleet of last mile delivery of electric vehicles in advance. All requisite information such as the one or more required services for delivery and peak energy demand periods are known a priori. The fulfilment center and the grid share the necessary details a priori in advance. The electric vehicles leave the depot at a given time with a starting state-of-charge (SoC) of $q^u$. Their target is to complete all the users' deliveries and return back to the same depot with at least 'x %' (e.g., say value of x=20%) remaining SoC. During the delivery period, electric vehicles could also visit a discharging station and sell the power back to the grid in a time defined manner that does not impact the delivery of the user one or more required services. Electric vehicles can also visit battery swapping stations to replace their current battery with a fully charged one.

Referring now to the steps of the method 300, at step 304, the one or more hardware processors 104 generate a graph of the user request, wherein in the graph each node represents the depot, a set of users, a set of discharging stations, and a set of battery swap stations, and an edge represents a relation between two or more connecting nodes. Here, the graph G=(V,E) represents a complete undirected graph, where the set of nodes is denoted by V={$v_0$}∪K∪P∪F, and the set of edges connecting the nodes is denoted by E={(i, j): i, j∈ V, i≠j}. The set of nodes comprises the depot denoted as $v_0$, the set of users 206 denoted as K={$k_1$, . . . , $k_m$}, the set of discharging stations denoted as P={$p_1$, . . . , $p_n$}, and the set of battery swap stations denoted as F={$f_1$, . . . , $f_s$} denotes the set of battery swap stations.

The depot $v_0$ holds a homogeneous fleet of the electric vehicles denoted by X={$x_1$, . . . , $x_u$}, each with a carrying capacity of C; a battery capacity of Q; and starting with the SoC of $q_u$. Each user $k_m$∈K has a positive demand of $c_i$; service time of $s_i$; and the time window of [$e_i$, $l_i$]. Each edge is associated with a travel distance of $d_{ij}$, a travel time of $t_{ij}$ and a travel energy of $b_{ij}$.

The EV battery is depleted at: (a) H(kWh/km) when traveling between two nodes; and (b) R(kWh) when discharging by giving power back to the grid during peak demand periods between $g_i^1$ and $g_i^2$ at discharging station node i. It is noted that there is only one peak demand period for the grid in a day, and therefore, EVs discharge only once per day. Each battery swap operation incurs a fixed cost W. All notations used are summarized in Table 1.

TABLE 1

| Variable definitions | |
| --- | --- |
| Symbol | Meaning |
| t | Time instant when decisions are made |
| [1, T] | Decision horizon |
| | Sets |
| V = {$v_0$} ∪ K ∪ P ∪ F | Set of {m + n + o + 1} nodes |
| K = {$k_1$, . . . , $k_m$} | Set of m users |
| P = {$p_1$, . . . , $p_n$} | Set of n discharging stations |

TABLE 1-continued

| Variable definitions | |
| --- | --- |
| Symbol | Meaning |
| F = {$f_1$, . . . , $f_o$} | Set of o battery swapping stations |
| X = {$x_1$, . . . , $x_u$} | Set of u electric vehicles |
| | User |
| $e_i$ | Earliest start of service at node i (time) |
| $l_i$ | latest start of service at node i (time) |
| $s_i$ | Service time at user node i |
| $c_i$ | Demand of goods at user node i |
| | Travel |
| $d_{ij}$ | Distance between nodes i and j |
| $t_{ij}$ | Distance between nodes i and j |
| H | Charge consumption (kWh/km) rate |
| $b_{ij}$ | Energy consumed in travelling between nodes i and j (=H · $d_{ij}$) |
| | Vehicle |
| C | Carrying capacity of each electric vehicle |
| Q | Total battery capacity of each electric vehicle |
| $q^u$ | Battery level of electric vehicle u at the start of the trip |
| | Grid ǀ Discharging station ǀ Battery swapping station |
| $g_i^1$ | Start time: grid peak demand at station node i |
| $g_i^2$ | end time: grid peak demand at station node i |
| $y_i^u$ | Service time of electric vehicle at u at each discharging station |
| R | Discharging rate at each discharging station |
| W | Cost of each battery swap operation |
| | Decision variables |
| $\alpha_{ij}^u$ | 1: if edge ij is traversed by electric vehicle u 0: otherwise |
| $\tau_i^u$ | Time of arrival of electric vehicle u at node i |
| $\theta_i^u$ | Battery level of electric vehicle u on arrival at node i |
| $\lambda_i^u$ | Remaining cargo of electric vehicle u on arrival at node i |

In one embodiment, the one or more operational constraints considered to process the user request which minimizes the trip cost of the fleet are denoted below, where the user request is represented in Equation 1, $$M = \min\left(Y_1 \cdot \sum_{u \in X}\sum d_{ij}\alpha_{ij}^u + Y_2 \cdot \sum_{u \in X}\sum_{i \in V}\alpha_{oi}^u + Y_3 \cdot \sum_{u \in X}\sum_{i \in V, j \in F}\alpha_{ij}^u - Y_4 \cdot \sum_{u \in X}\sum_{i \in P}\gamma_i^u * \sum_{j \in V}\alpha_{ij}^u\right)$$

Equation 1

Where, M is taken as the combined weighted cost for the total distance travelled by each of the electric vehicles, the number of such electric vehicles used in the trip, the number of battery swap operations used by the electric vehicles minus the revenue gained due to the time spent at discharging stations and selling power back to the grid.

Equation 2 ensures that every user is visited exactly once while making the visit to any of the discharging or battery swapping stations as optional.

$$\sum_{u \in X} \sum_{i \in V, i \neq j} \alpha_{ij}^u = 1 \ \forall \ i \in K \qquad \text{Equation 2}$$

Equation 3 establishes the journey period where the number of incoming electric vehicles are equal to the number of outgoing electric vehicles at each node.

$$\sum_{j \in V, i \neq j} \alpha_{ij}^u = \sum_{k \in V, i \neq j} \alpha_{ji}^u \ \forall \ j \in V, \forall \ j \in X \qquad \text{Equation 3}$$

Equation 4, Equation 5, and Equation 6 guarantee time feasibility of electric vehicles leaving from the user current location, the set of discharging stations, the set of battery swap stations and the depot. Equation 4 and Equation 5 account for the travel time to the user or the discharging station nodes, and the time required to complete the respective service.

$$\tau_i^u + (t_{ij} + s_i) * \alpha_{ij}^u - l_o * \left(1 - \alpha_{ij}^u\right) \leq \tau_j^u \qquad \text{Equation 4}$$

$$\forall \ i \in K, \forall \ j \in V, \forall \ u \in X$$

$$\tau_i^u + (t_{ij} + \gamma_i^u) * \alpha_{ij}^u - l_o * \left(1 - \alpha_{ij}^u\right) \leq \tau_j^u \qquad \text{Equation 5}$$

$$\forall \ i \in P, \forall \ j \in V, \forall \ u \in X$$

Equation 6 denotes the set of battery swap operation assuming that the turnaround time is small.

$$\tau_i^u + t_{ij} * \alpha_{ij}^u - l_o * \left(1 - \alpha_{ij}^u\right) \leq \tau_j^u \qquad \text{Equation 6}$$

$$\forall \ i \in F, \forall \ j \in V, \forall \ u \in X$$

The condition that each node must be visited within its time window is ensured by Equation 7.

$$e_i * \sum_{j \in V} \alpha_{ij}^u \leq \tau_i^u \leq l_i * \sum_{j \in V} \alpha_{ij}^u \ \ \forall \ i \in K, \forall \ u \in X \qquad \text{Equation 7}$$

Equation 8 represents that the discharge service time aligns with the grid peak demand period if the set of discharging stations are visited.

$$g_j^1 * \sum_{j \in V} \alpha_{ij}^u \leq \tau_i^u \leq g_i^2 * \sum_{j \in V} \alpha_{ij}^u \ \ \forall \ i \in P, \forall \ u \in X \qquad \text{Equation 8}$$

Equation 9 Equation 10 and Equation 11 enforce remaining charge (energy) feasibility for the electric vehicles leaving the user node, the set of discharging stations, the set of battery swapping stations, and the depot. For user nodes, only the energy needed to reach the node is considered in Equation 9, $$\theta \leq \theta_j^u \leq \theta_i^u - (H. d_{ij}) * \alpha_{ij}^u + Q * \left(1 - \alpha_{ij}^u\right) \qquad \text{Equation 9}$$

$$\forall \ i \in K, \forall \ j \in V, \forall \ u \in X, i \neq j$$

For discharging nodes, the travel energy along with the energy lost from each discharging node is described in Equation 10, $$\theta \leq \theta_j^u \leq \theta_i^u - (H. d_{ij} + R * \gamma_i^u) * \alpha_{ij}^u + Q * \left(1 - \alpha_{ij}^u\right) \qquad \text{Equation 10}$$

$$\forall \ i \in P, \forall \ j \in V, \forall \ u \in X, i \neq j$$

Equation 11 ensures that a fully charged battery is provided at battery swapping nodes.

$$0 \leq \theta\_j^\wedge u \leq Q - (H \cdot d\_{ij}) * \alpha\_ij^\wedge u + Q * (1 - \alpha\_ij^\wedge u) \forall \ i \in F, \qquad \text{Equation 11}$$

$$\forall \ j \in V, \forall \ u \in X, i \neq j$$

The demand fulfillment of all users awaiting order delivery is guaranteed by Equation 12.

$$\lambda_i^u - C_i * \lambda_{ij}^u - C * \left(1 - \lambda_{ij}^u\right) \leq \lambda_j^u \leq \lambda_i^u - c_i * \lambda_{ij}^u + C * \left(1 - \lambda_{ij}^u\right) \qquad \text{Equation 12}$$

$$\forall \ i, j \in X, \forall \ u \in X$$

Equation 13 and Equation 14 assign the initial SoC and cargo capacity values to an EV when it starts from the depot.

$$\theta_o^u \geq q^u \ \forall \ u \in X \qquad \text{Equation 13}$$

$$\lambda_o^u \geq C \ \forall \ u \in X \qquad \text{Equation 14}$$

Equation 15 ensures that each EV returns to the depot with a minimum amount of charge.

$$\theta_o^u \geq 0.2 * Q \ \forall \ u \in X \qquad \text{Equation 15}$$

The learning agent learns by interacting with the delivery environment and obtains feedback from its own actions and experiences.

Referring now to the steps of the method 300, at step 306, the one or more hardware processors 104 model by using a state generator a state of the learning agent to process the user request and assigning a reward value to the learning agent for every associated action. The learning agent has the (state, action) space defined and the reward function. The learning agent learns a routing policy that assigns vehicles to nodes at a specific point in time. Therefore, a set of states enumerated for each possible (vehicle to node) assignment at each decision epoch. The action that yields the maximum value is chosen and applied to the delivery environment to obtain the immediate reward. The method of the present disclosure builds the solution by mapping electric vehicle to user request, discharging or battery swapping station nodes at every decision epoch which eventually leading to an optimized routing policy.

Figure 4:
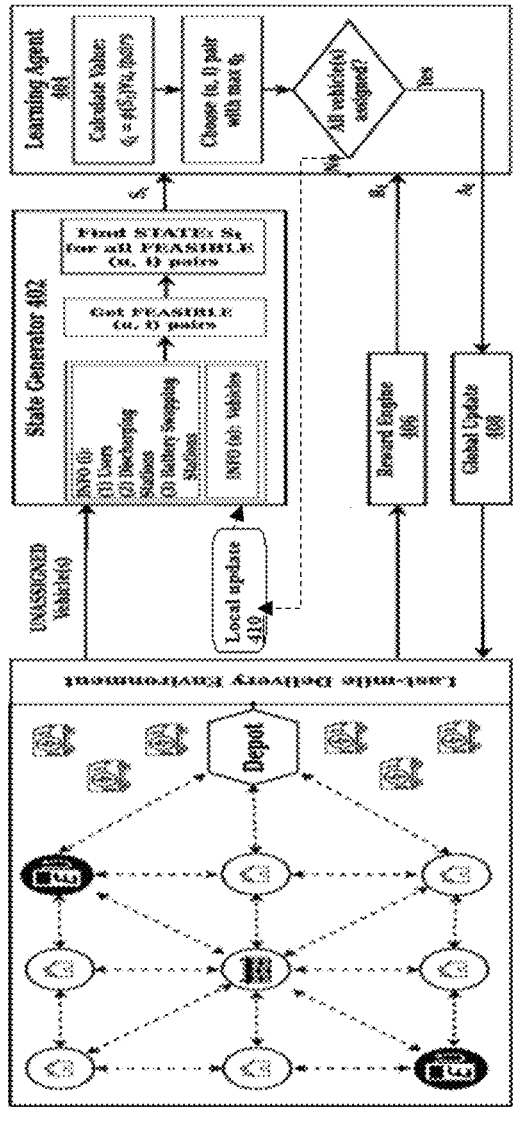
FIG. 4 illustrates a training model for learning agent to generate the route map based on user request according to some embodiments of the present disclosure.

Referring now to FIG. 4, illustrating a training model for learning agent to generate the route map based on user request according to some embodiments of the present disclosure. FIG. 4 is the electric vehicle routing system comprising the delivery environment, a state generator 402, a learning agent 404, a reward engine 406, a global update 408, and a local state update 410.

The state generator 402 has information about individual (vehicle, node) pairs for each vehicle u at time t for proposed node i are given as input to the learning agent. the state of the learning agent includes an energy consumed in travelling between nodes i and j, an energy spent at node i, a current battery capacity of the electric vehicle, a depot flag, a user flag, a battery swap station flag, a wait time of electric vehicle at node i before starting its current service, and a number of feasible nodes that the electric vehicle visits. The definition used for the observed system state is denoted in Equation 16, $$S_t = \left[ b_{ij}, z_i, s_u, I_{depo}, I_{cus}, w_u^j, I_{batt}, N_{feasible}^u \right] \qquad \text{Equation 16}$$

observed at the time t for each (u,i) as shown in Table 2.

TABLE 2

| Learning agent: state variables | |
|---|---|
| Input | Explanation |
| $b_{ij}$ | Energy consumed in travelling between nodes i and j |
| $z_i$ | Energy spent at node I (0: if at user or battery swap node) |
| $s_u$ | Current battery capacity of vehicle u |
| $I_{depo}$ | Flag: indicates if vehicle is starting from the depot |
| $I_{user}$ | Flag: indicates if node i is starting is the user |
| $I_{batt}$ | Flag: indicates if node i is the battery swap station |
| $w_u^i$ | Wait time of vehicle u at node i before it can start service |
| $N_{feasible}^u$ | Number of feasible nodes that vehicle u can visit |

Every electric vehicle spends energy under two conditions, first if they are traveling between two nodes and second if they are selling energy at discharging stations. These two aspects are captured by $b_{ij}$ and $z_i$ respectively. The $b_{ij}$ also serves as a proxy variable to ascertain the distance travelled between the nodes. Along with the energy spent, the amount of energy left in the vehicle u is tracked through $s_u$. An extension to the signal is represented as $N_{feasible}^u$ that keeps track of the number of feasible nodes that the vehicle u can visit at a given instance. The three supporting binary variables $I_{depo}$, $I_{cus}$ and $I_{batt}$ help to capture the departure status of the vehicle from the depot, and the location of the destination location node (user/discharging station/battery swapping station). The final variable $w_u^i$ captures the wait time of the electric vehicle u at the destination location node i before it can start the service. The following constants are used for normalizing the non-binary state variables such as, (i) E (that denotes the energy required to travel the diagonal length of the graph) is used for $b_{ij}$, $z_i$, $s_u$ (ii) T (that denotes the decision time horizon) is used for $w_u^i$.

The learning agent 404 performs the action $A_t$ for the (vehicle, node) pair at decision time t. It is selected either at the start of each episode when all the electric vehicles are available at the depot for providing service, or when any vehicle becomes available post completing the assigned service. This action is derived in the following manner, where the learning agent computes the respective value for each (u,i) pair (irrespective of their availability status) and chooses the pair with the maximum value. If the chosen (u→i) mapping includes the electric vehicle that is currently in service, a local state update 410 is made to capture the assignment. This update includes removing the chosen node from the service list and making changes to the distance and time factors. The process is repeated either until all available vehicles or nodes get assigned, post which the global environment is updated along with the reward for the assignment action.

The reward engine 406 has chosen (vehicle, node) pair, the reward $R_t$ is taken as the total cost of vehicle u visiting node i at time t. It is defined in Equation 17, $$R_t = -A_1 * b_{ij} + A_2 * z_i + A_3 * I_{cust} - $$
$$A_4 * w_u^i - A_5 * I_{batt} * s_u + A_6 * I_{batt} * \left(1/N_{feasible}^u\right) \qquad \text{Equation 17}$$

The learning agent receives the positive reward for visiting either the user node or the discharging station node. The learning agent receives the negative reward when at least one of the criteria is satisfied such as if the agent selects a longest route map for performing the user request or if the one or more nodes have a wait time, or if the one or more newly configured electric vehicles are identified from the depot, or an availability of minimal charge in the battery. The learning agent receives the negative reward for choosing the longer route segments for assignments that lead to waiting time at nodes and for sending the new vehicles from the depot. The reward for visiting the set of battery swapping station is positive when the alternatives (i.e., feasible pairs) are few while it is negative reward when there is significant remaining charge in the battery. These two terms collectively encourage the set of battery swapping stations when the electric vehicle SoC is low for it to visit more users. The selected values are $A_1$=0.15, $A_2$=0.001, $A_3$=0.15, $A_4$=0.65, $A_5$=0.5, $A_6$=0.5 since they gave the best solutions on the training data.

In one embodiment for the vehicle to node masking scheme, for each decision step t, possible assignments are identified for their feasibility. The learning agent produces a scalar output for each of these feasible pairs. The masking scheme derives these feasible pairs. Considering the next node of vehicle u, currently at node i, is node j. The pair (u,j) is considered infeasible if it satisfies any of the following condition as mentioned below, i. Node j is the user with unfulfilled demand that is either nil or exceeds the remaining carrying load of vehicle u.

ii. Node j is the user and the current SoC of the vehicle cannot support the complete trip from node i to j and back to the depot.

iii. The earliest arrival time at node j violates the TW constraint.

iv. Node j is a discharging station and the vehicle's current SoC cannot support the complete trip from node i to j and back to the depot, as well as the discharge operation at node j.

v. Node j is an SWP location and the current SoC of the vehicle cannot support the complete trip from node i to node j.

Referring now to the steps of the method 300, at step 308 the one or more hardware processors 104 generate by using the learning agent, a route map indicating a plurality of waypoint locations for the electric vehicle to visit each node in accordance with minimized trip cost of fleet and time duration, wherein each node has a state action pair for a driver of the electric vehicle, wherein the learning agent learns continuously during the interaction with the delivery environment and obtains feedback for every associated action.

The learning agent is trained (refer Table 3) to generate the route map by performing the steps of by initialising a neural network with one or more weights $\phi$, a batch size $\beta$, and a replay buffer B. Further for every episode, the learning agent learns to map state and one or more feasible action pairs by randomly selecting data instance from a training dataset and resetting the delivery environment to obtain initial states of all vehicle node pairs from the depot. Further, the learning agent creates a copy of the delivery environment for local state updates when a decision time instant t is lesser than a decision horizon T.

TABLE 3

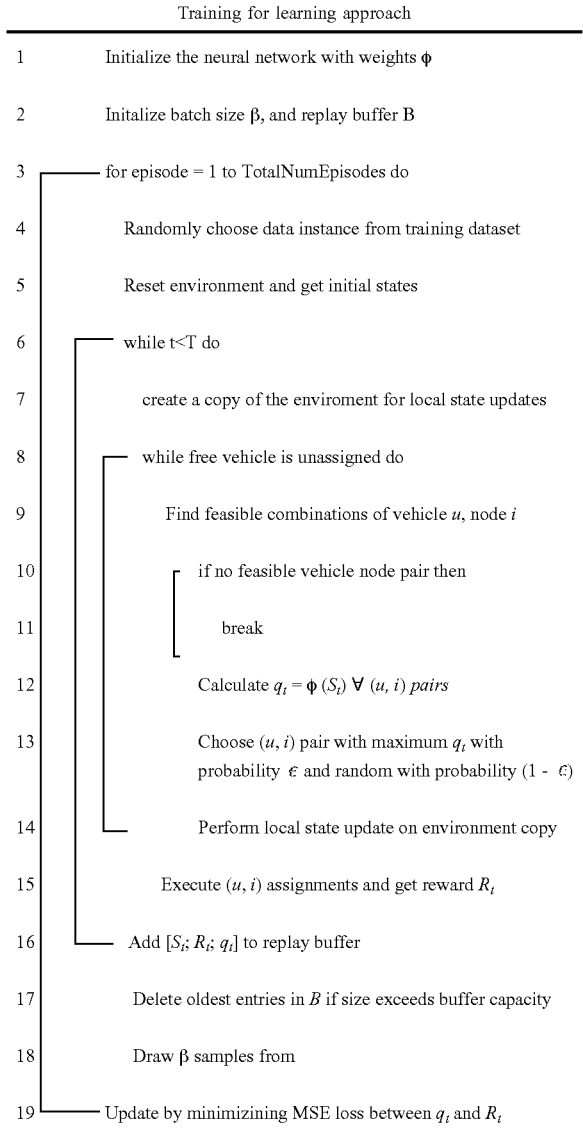

| | Training for learning approach |
|---|---|
| 1 | Initialize the neural network with weights $\phi$ |
| 2 | Initalize batch size $\beta$, and replay buffer B |
| 3 | for episode = 1 to TotalNumEpisodes do |
| 4 | Randomly choose data instance from training dataset |
| 5 | Reset environment and get initial states |
| 6 | while t<T do |
| 7 | create a copy of the enviroment for local state updates |
| 8 | while free vehicle is unassigned do |
| 9 | Find feasible combinations of vehicle $u$, node $i$ |
| 10 | if no feasible vehicle node pair then |
| 11 | break |
| 12 | Calculate $q_t = \phi(S_t) \; \forall \; (u, i) \; pairs$ |
| 13 | Choose $(u, i)$ pair with maximum $q_t$ with probability $\varepsilon$ and random with probability $(1 - \varepsilon)$ |
| 14 | Perform local state update on environment copy |
| 15 | Execute $(u, i)$ assignments and get reward $R_t$ |
| 16 | Add $[S_t; R_t; q_t]$ to replay buffer |
| 17 | Delete oldest entries in $B$ if size exceeds buffer capacity |
| 18 | Draw $\beta$ samples from |
| 19 | Update by minimizining MSE loss between $q_t$ and $R_t$ |

Further, one or more feasible combinations of vehicle node pairs are identified based on the availability of electric vehicle from the set of electric vehicles. Then, the learning agent calculates an action value $q_t$ for each feasible combination of vehicle node pair by sending the state $S_t$ of the learning agent as input to the neural network. Further, the learning agent selects feasible vehicle node pair based on maximum action value and performing local state updates on the copy of the delivery environment. The learning agent assigns a reward $R_t$ for every associated action performed in each feasible vehicle node pair. The replay buffer is updated with the state $S_t$, the reward $R_t$, and the action value $q_t$. The oldest entries are deleted from the replay buffer B size when exceeds a predefined buffer capacity and randomly removes $\beta$ samples from the replay buffer B at an end of every episode. Then, the one or more weights $\phi$ of the neural network are updated by minimizing the mean squared error (MSE) between the action value $q_t$ and the reward $R_t$.

The state variables described above are used by the learning agent to produce a scalar value output for each (vehicle u, node i) pair. The trigger for these computations is either the start of an episode (t=0), or a vehicle becoming free at step t>0. For each vehicle u, the list of possible node j combinations are enumerated based on the masking scheme described above. The learning agent finds a value $q_t$ for each of these combinations by sending the state $S_t$ as input to the value network and chooses the one that yields the highest value. This computation is done regardless of the current state of each vehicle (busy or free). If the chosen mapping assigns a node to the vehicle that triggered the computation, the decision is communicated to the environment that returns a reward $R_t$. However, if the chosen pair belongs to a vehicle that is currently busy, a local state update is done to emulate the assignment. This process continues until the trigger vehicle gets an assignment, or all the users are serviced; post which all assignments are communicated to the environment to get the corresponding rewards. It is followed by an update of the replay buffer with $[S_t; R_t; q_t]$ for that respective (u,i) pair. At the end of the episode $\beta$ samples are drawn randomly from the replay buffer B. The value network weights $\phi$ is updated by minimizing the mean squared error (MSE) between $q_t$ and the reward $R_t$. The (state, action) mapping is learned by the agent in this manner.

Figure 5:
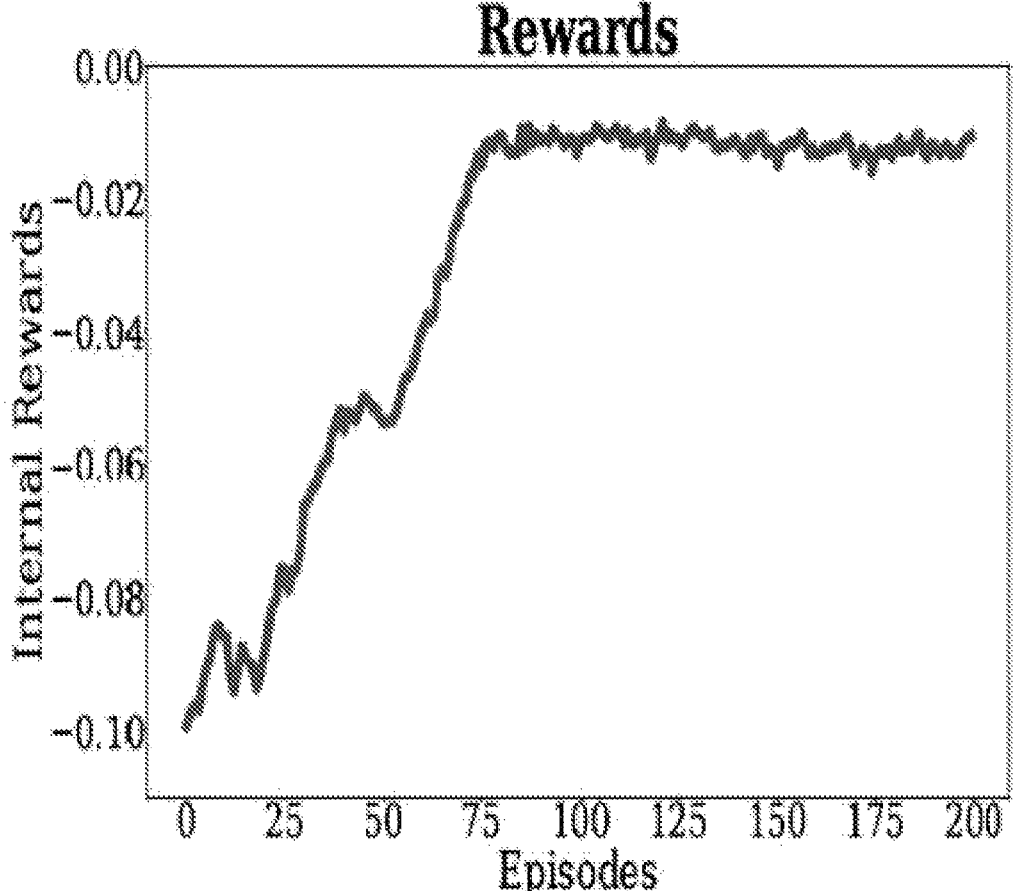
FIG. 5 is a diagram of average rewards obtained by the learning agent for different episodes during training according to some embodiments of the present disclosure.

FIG. 5 is a diagram of average rewards obtained by the learning agent for different episodes during training according to some embodiments of the present disclosure. The neural network architecture and the hyperparameters used in the learning and testing comprise of one input layer, one output layer, and three hidden layers, wherein the Adam optimizer and the learning rate is 0.001, the batch size ($\beta$) is 16, the replay buffer size (B) is 5000, the exploration policy: $\epsilon$-greedy with exploration factor decaying linearly from 1 to 0 over 75 episodes. The training consists of 200 episodes where each episode is a different instance (for example a random combination of vehicles, users, discharge stations, SWP stations). The neural network is implemented using the Pytorch library in Python 3.6.

The neural network training trains the learning agent using randomly generated datasets which included 4 vehicles, 20 users, 5 discharging stations, and 5 battery swapping stations. It is to be understood by a person having ordinary skill in the art or person skilled in the art that such datasets shall not be construed as limiting the scope of the present disclosure. The coordinates of the users, the discharging stations, and the battery swapping stations were generated uniformly within the range [−100, 100] whereas the depot location was distributed uniformly randomly in [−25,25]. The user demand ci is drawn from an exponential distribution with 0.1 scale parameter. The maximum loading capacity C and battery capacity Q of each vehicle is chosen as C=Q=200 units. The speed of the electric vehicle, the charge consumption rate Hi and the energy discharge rate R is taken as one unit in their respective units. The earliest start of service time ei is drawn randomly between 0 and 200 units. The service time duration ($=l_i−e_i$) is chosen from the gaussian distribution with mean of 35 units and standard deviation of 5 units (clipped to a minimum of 1 unit). At each training episode, a new random instance is generated using these parameters. Once the learning agent is trained the same parameters are used for testing.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of vehicle routing. The embodiments thus provide method and system of electric vehicle route planning for multi-service delivery and on-route energy replenishment. Moreover, the embodiments herein further provide an efficient and scalable method which incorporates selling energy back to the grid. The trained learning agent generalizes different problem instances and inference time is also very less. Electric vehicle fleets ideally generate additional revenue to reduce their total cost of ownership and handles non-availability of rapid and readily available energy replenishment.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of electric vehicle routing planning for multi-service delivery and on-route energy replenishment, comprising:

receiving by a depot of a delivery environment via one or more hardware processor, a user request comprising a current location of the user, one or more required services, and a time window rendered between each of the required services, wherein the depot comprises a trained learning agent and a set of preconfigured electric vehicles (EV), wherein an EV routing system is installed in the delivery environment, wherein for the received user request, route analysis is performed by considering a plurality of factors;

generating via the one or more hardware processors, a graph of the user request, wherein in the graph each node represents the depot, a set of users, a set of discharging stations, and a set of battery swap stations, and an edge represents a relation between two or more connecting nodes;

modelling by using a state generator via the one or more hardware processors, a state of the learning agent to process the user request and assigning a reward value to the learning agent for every associated action, wherein the learning agent learns a routing policy which assigns vehicles to nodes at a specific point in time and a set of states enumerated for each possible assignment at each decision epoch, wherein mapping electric vehicle to the user request, discharging or battery swapping station nodes at every decision epoch leading to an optimized routing policy, wherein the state of the learning agent includes an energy consumed in travelling between nodes i and j, an energy spent at node i, a current battery capacity of the electric vehicle, a depot flag $I_{depo}$, a user flag $I_{user}$, a battery swap station flag $I_{batt}$, a wait time of electric vehicle at node i before starting its current service $w_u^i$, a number of feasible nodes that the electric vehicle visits $N_{feasible}^u$; and generating by the learning agent via the one or more hardware processors, a route map indicating a plurality of waypoint locations for the electric vehicle to visit each node in accordance with minimized trip cost of fleet and time duration, wherein each node has a state action pair for a driver of the electric vehicle, wherein the learning agent learns continuously during the interaction with the delivery environment and obtains feedback for every associated action, wherein the learning agent is trained to generate the route map by performing the steps of:

initializing a neural network with one or more weights $\phi$, a batch size $\beta$, and a replay buffer B; and iteratively performing for every episode, where the learning agent learns to map state and one or more feasible action pairs by, randomly selecting data instance from a training dataset and reset the delivery environment to obtain initial states of all possible vehicle node pairs from the depot;

creating a copy of the delivery environment for local state updates when a decision time instant t is lesser than a decision horizon T;

identifying one or more feasible combinations of vehicle node pairs based on availability of electric vehicle from the set of electric vehicles;

calculating an action value $q_t$ for each feasible combination of vehicle node pair by sending the state $S_t$ of the learning agent as an input to the neural network;

selecting feasible vehicle node pair based on maximum action value and performing local state updates on the copy of the delivery environment;

assigning a reward $R_t$ for the learning agent for every associated action performed in each feasible vehicle node pair;

updating the replay buffer with the state $S_t$, the reward $R_t$, and the action value $q_t$;

deleting oldest entries from the replay buffer B size exceeds a predefined buffer capacity;

randomly removing $\beta$ samples from the replay buffer B at an end of every episode; and updating the one or more weights $\phi$ of the neural network by minimizing a mean squared error (MSE) between the action value $q_t$ and the reward $R_t$.i.

2. The processor implemented method as claimed in claim 1, wherein the one or more required services includes a user order list, an energy delivery to a grid via the set of discharging stations, and an energy pickup service from the set of battery swapping stations, finding one or more optimal routes that guarantee order fulfillment and augment revenue through vehicle to grid.

3. The processor implemented method as claimed in claim 1, wherein a positive reward is assigned to the learning agent when the electric vehicle visits at least one of a user node, a discharging station node, and a battery swapping station.

4. The processor implemented method as claimed in claim 1, wherein a negative reward is assigned to the learning agent when at least one of (i) a longest route map is selected, (ii) one or more nodes have a wait time, (iii) one or more newly configured electric vehicles are identified from the depot, or (iv) an availability of minimal charge in a battery.

5. A system of electric vehicle routing planning for multi-service delivery and on-route energy replenishment comprising:

a memory storing instructions;

one or more communication interfaces; and one or more hardware processors coupled to the memory via the one or more communication interfaces, wherein the one or more hardware processors are configured by the instructions to:

receive by a depot of a delivery environment, a user request comprising a current location of the user, one or more required services, and a time window rendered between each of the required services, wherein the depot comprises a trained learning agent and a set of preconfigured electric vehicles (EV), wherein an EV routing system is installed in the delivery environment, wherein for the received user request, route analysis is performed by considering a plurality of factors;

generate a graph of the user request, wherein in the graph each node represents the depot, a set of users, a set of discharging stations, and a set of battery swap stations, and an edge represents a relation between two or more connecting nodes;

model by using a state generator, a state of the learning agent to process the user request and assigning a reward value to the learning agent for every associated action, wherein the learning agent learns a routing policy which assigns vehicles to nodes at a specific point in time and a set of states enumerated for each possible assignment at each decision epoch, wherein mapping electric vehicle to the user request, discharging or battery swapping station nodes at every decision epoch leading to an optimized routing policy, wherein the state of the learning agent includes an energy consumed in travelling between nodes i and j, an energy spent at node i, a current battery capacity of the electric vehicle, a depot flag $I_{depo}$, a user flag $I_{user}$, a battery swap station flag $I_{batt}$, a wait time of electric vehicle at node i before starting its current service $w_u^i$, a number of feasible nodes that the electric vehicle visits $N_{feasible}^u$; and generate by the learning agent, a route map indicating a plurality of waypoint locations for the electric vehicle to visit each node in accordance with minimized trip cost of fleet and time duration, wherein each node has a state action pair for a driver of the electric vehicle, wherein the learning agent learns continuously during the interaction with the delivery environment and obtains feedback for every associated action, wherein the learning agent is trained to generate the route map by performing the steps of:

initializing a neural network with one or more weights $\phi$, a batch size $\beta$, and a replay buffer B; and iteratively performing for every episode, where the learning agent learns to map state and one or more feasible action pairs by, randomly selecting data instance from a training dataset and reset the delivery environment to obtain initial states of all possible vehicle node pairs from the depot;

creating a copy of the delivery environment for local state updates when a decision time instant t is lesser than a decision horizon T;

identifying one or more feasible combinations of vehicle node pairs based on availability of electric vehicle from the set of electric vehicles;

calculating an action value $q_t$ for each feasible combination of vehicle node pair by sending the state $S_t$ of the learning agent as an input to the neural network;

selecting feasible vehicle node pair based on maximum action value and performing local state updates on the copy of the delivery environment;

assigning a reward $R_t$ for the learning agent for every associated action performed in each feasible vehicle node pair;

updating the replay buffer with the state $S_t$, the reward $R_t$, and the action value $q_t$;

deleting oldest entries from the replay buffer B size exceeds a predefined buffer capacity;

randomly removing $\beta$ samples from the replay buffer B at an end of every episode; and updating the one or more weights $\phi$ of the neural network by minimizing a mean squared error (MSE) between the action value $q_t$ and the reward $R_t$.i.

6. The system of claim 5, wherein the one or more required services includes a user order list, an energy delivery to a grid via the set of discharging stations, and an energy pickup service from the set of battery swapping stations, finding one or more optimal routes that guarantee order fulfillment and augment revenue through vehicle to grid.

7. The system of claim 5, wherein a positive reward is assigned to the learning agent when the electric vehicle visits at least one of a user node, a discharging station node, and a battery swapping station.

8. The system of claim 5, wherein a negative reward is assigned to the learning agent when at least one of (i) a longest route map is selected, (ii) one or more nodes have a wait time, (iii) one or more newly configured electric vehicles are identified from the depot, or (iv) an availability of minimal charge in a battery.

9. One or more non-transitory machine-readable information storage mediums comprising one or more instructions which when executed by one or more hardware processors cause:

receiving by a depot of a delivery environment a user request comprising a current location of the user, one or more required services, and a time window rendered between each of the required services, wherein the depot comprises a trained learning agent and a set of preconfigured electric vehicles (EV), wherein an EV routing system is installed in the delivery environment, wherein for the received user request, route analysis is performed by considering a plurality of factors;

generating a graph of the user request, wherein in the graph each node represents the depot, a set of users, a set of discharging stations, and a set of battery swap stations, and an edge represents a relation between two or more connecting nodes;

modelling by using a state generator a state of the learning agent to process the user request and assigning a reward value to the learning agent for every associated action, wherein the learning agent learns a routing policy which assigns vehicles to nodes at a specific point in time and the set of states enumerated for each possible assignment at each decision epoch, wherein mapping electric vehicle to the user request, discharging or battery swapping station nodes at every decision epoch leading to an optimized routing policy; and generating by the learning agent a route map indicating a plurality of waypoint locations for the electric vehicle to visit each node in accordance with minimized trip cost of fleet and time duration, wherein each node has a state action pair for a driver of the electric vehicle, wherein the learning agent learns continuously during the interaction with the delivery environment and obtains feedback for every associated action, wherein the learning agent is trained to generate the route map by performing the steps of:

initializing a neural network with one or more weights $\phi$, a batch size $\beta$, and a replay buffer B; and iteratively performing for every episode, where the learning agent learns to map state and one or more feasible action pairs by, randomly selecting data instance from a training dataset and reset the delivery environment to obtain initial states of all possible vehicle node pairs from the depot;

creating a copy of the delivery environment for local state updates when a decision time instant t is lesser than a decision horizon T;

identifying one or more feasible combinations of vehicle node pairs based on availability of electric vehicle from the set of electric vehicles;

calculating an action value $q_t$ for each feasible combination of vehicle node pair by sending the state $S_t$ of the learning agent as an input to the neural network;

selecting feasible vehicle node pair based on maximum action value and performing local state updates on the copy of the delivery environment;

assigning a reward $R_t$ for the learning agent for every associated action performed in each feasible vehicle node pair;

updating the replay buffer with the state $S_t$, the reward $R_t$, and the action value $q_t$;

deleting oldest entries from the replay buffer B size exceeds a predefined buffer capacity:

randomly removing $\beta$ samples from the replay buffer B at an end of every episode; and updating the one or more weights $\phi$ of the neural network by minimizing a mean squared error (MSE) between the action value $q_t$ and the reward $R_t$.i.

10. The one or more non-transitory machine-readable information storage mediums of claim 9, wherein the one or more required services includes a user order list, an energy delivery to a grid via the set of discharging stations, and an energy pickup service from the set of battery swapping stations, finding one or more optimal routes that guarantee order fulfillment and augment revenue through vehicle to grid.

11. The one or more non-transitory machine-readable information storage mediums of claim 9, wherein a positive reward is assigned to the learning agent when the electric vehicle visits at least one of a user node, a discharging station node, and a battery swapping station.

12. The one or more non-transitory machine-readable information storage mediums of claim 9, wherein a negative reward is assigned to the learning agent when at least one of (i) a longest route map is selected, (ii) one or more nodes have a wait time, (iii) one or more newly configured electric vehicles are identified from the depot, or (iv) an availability of minimal charge in a battery.

13. The method as claimed in claim 1, wherein the plurality of factors comprise two or more of weight of EV, weight of trailer pulled by the EV, atmospheric condition, distance, grade, and elevation changes between starting location and destination, predicted rate of energy usage from the battery along a potential route, and location of charging stations along the route.

\* \* \* \* \*